(12) United States Patent
Bloomfield et al.

(10) Patent No.: US 9,665,369 B2
(45) Date of Patent: May 30, 2017

(54) FLEXIBLE MICROPROCESSOR REGISTER FILE

(71) Applicant: ZIILABS INC., LTD., Hamilton (BM)

(72) Inventors: Jonathan Bloomfield, Lightwater (GB); John Robson, Milton (GB); Nicholas Murphy, The Sands (GB)

(73) Assignee: ZIILABS INC., LTD., Hamilton (BM)

( * ) Notice: Subject to any disclaimer, the term of this patent is extended or adjusted under 35 U.S.C. 154(b) by 310 days.

(21) Appl. No.: 13/653,898

(22) Filed: Oct. 17, 2012

(65) Prior Publication Data

US 2013/0145131 A1 Jun. 6, 2013

Related U.S. Application Data

(63) Continuation of application No. 12/916,431, filed on Oct. 29, 2010, now abandoned, which is a continuation of application No. 11/537,425, filed on Sep. 29, 2006, now abandoned.

(51) Int. Cl.
*G06F 9/30* (2006.01)

(52) U.S. Cl.
CPC ...... *G06F 9/30098* (2013.01); *G06F 9/30032* (2013.01); *G06F 9/30036* (2013.01); *G06F 9/30109* (2013.01); *G06F 9/30134* (2013.01); *G06F 9/30141* (2013.01)

(58) Field of Classification Search
None
See application file for complete search history.

(56) References Cited

U.S. PATENT DOCUMENTS 6,754,809 B1 * 6/2004 Guttag et al. ............... 712/225
2006/0218373 A1 * 9/2006 Plondke et al. ............. 711/220

OTHER PUBLICATIONS

Jung et al.; A Register File with Transposed Access mode; 2000; IEEE.*
Shen et al; Modern Processor Design: Fundamentals of Superscalar Processing; McGraw Hill; 2002.*

* cited by examiner

*Primary Examiner* — Corey S Faherty
(74) *Attorney, Agent, or Firm* — Kwan & Olynick LLP

(57) ABSTRACT

Architectures and methods for viewing data in multiple formats within a register file. Various disclosed embodiments allow a plurality of consecutive registers within one register file to appear to be temporarily transposed by one instruction, such that each transposed register contains one byte or word from multiple consecutive registers. A program can arbitrarily reorganize the bytes within a register by swapping the value stored in any byte within the register with the value stored in any other byte within the same register. Indirect register access is also provided, without additional scoreboarding hardware, as an apparent move from one register to another. The functionality of a hardware data FIFO at the I/O is also provided, without the power consumption of register-to-register transfers. However, the size of the FIFO can be changed under program control.

20 Claims, 14 Drawing Sheets

Indirect register write.
The source data is in register 0, the index of the destination register is in register 3, the destination register is index 6.

The reads from registers 0 and 3 are checked against the scoreboard and will stall if a write already in flight will modify them. The write to register 6 is not scoreboarded and is unconditionally executed.

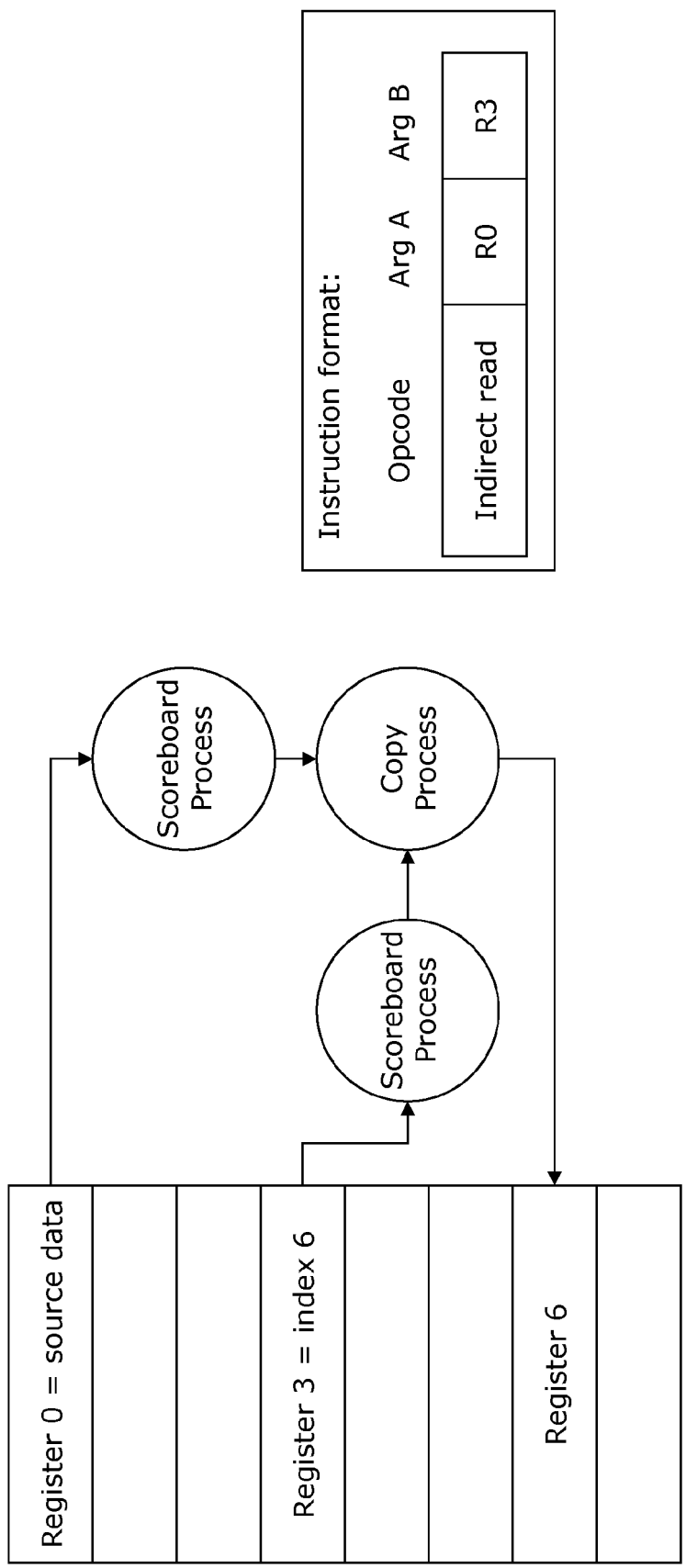
Figure 1: Indirect register write.
The source data is in register 0, the index of the destination register is in register 3, the destination register is index 6.
The reads from registers 0 and 3 are checked against the scoreboard and will stall if a write already in flight will modify them. The write to register 6 is not scoreboarded and is unconditionally executed.

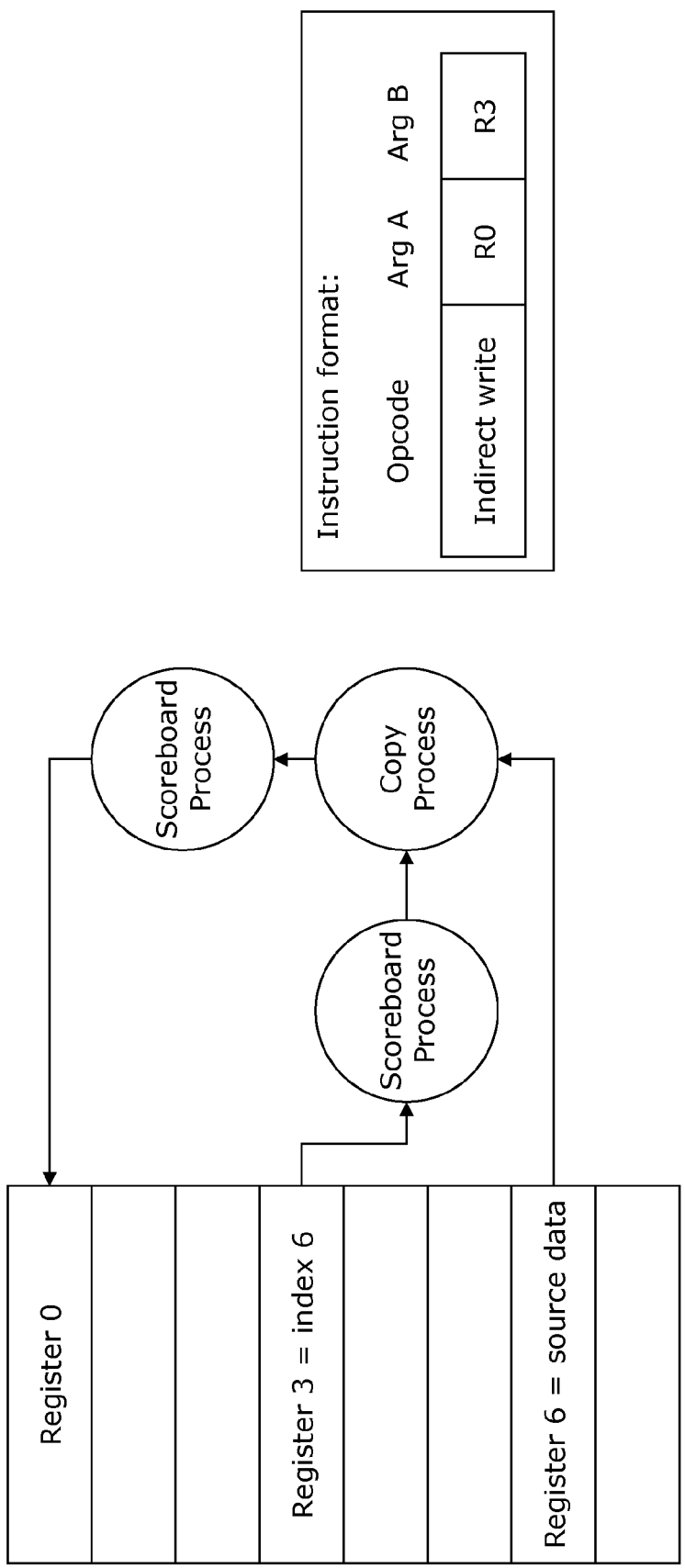

Figure 2: Indirect register read.
The source data is in register 6, the index of the source register is in register 3, the destination register is index 0.

The read from register 3 is checked against the scoreboard and will stall if a write already in flight will modify it. The read from register 6 is not scoreboarded and is unconditionally executed. The write to register 0 is scoreboarded.

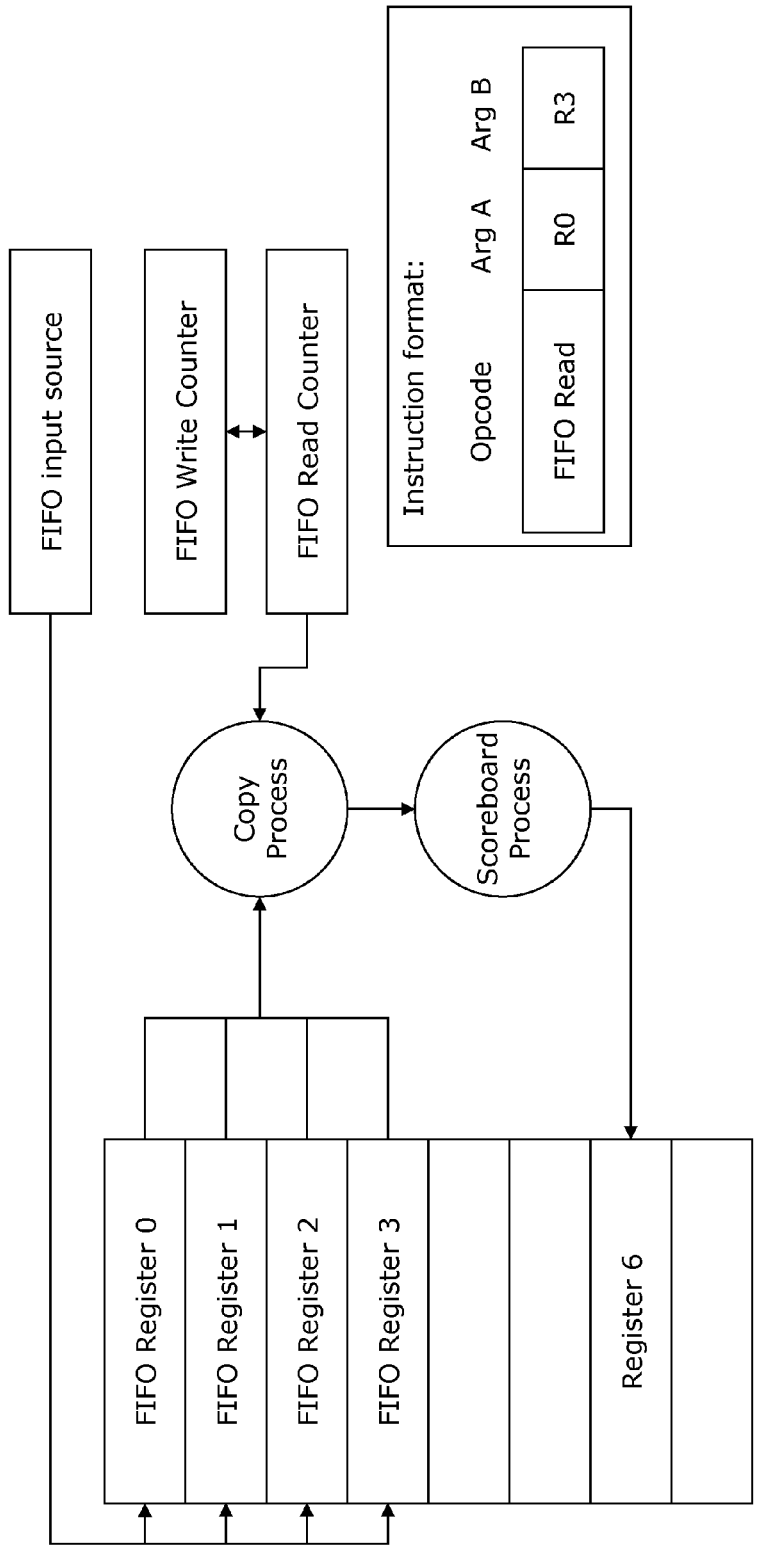

Figure 3: Register FIFO read.
Data is written into the FIFO from the FIFO input source. The FIFO write counter and FIFO read counter are compared to implement standard FIFO protocols.

Registers 0 to 3 are allocated to the FIFO. The FIFO counter indexes the FIFO entry to read. Register 6 is specified as the register to receive the FIFO data.

The read from the FIFO register is not scoreboarded, the write to the destination register is scoreboarded.

|        | Byte 3 | Byte 2 | Byte 1 | Byte 0 |
|--------|--------|--------|--------|--------|
| Word 5 | Blue 7 | Blue 6 | Blue 5 | Blue 4 |
| Word 4 | Green 7 | Green 6 | Green 5 | Green 4 |
| Word 3 | Red 7 | Red 6 | Red 5 | Red 4 |
| Word 2 | Blue 3 | Blue 2 | Blue 1 | Blue 0 |
| Word 1 | Green 3 | Green 2 | Green 1 | Green 0 |
| Word 0 | Red 3 | Red 2 | Red 1 | Red 0 |

Figure 4

FLEXIBLE MICROPROCESSOR REGISTER FILE

BACKGROUND AND SUMMARY

The present application relates to programmable circuits, and more particularly to I/O circuitry with selectable data reordering for graphics.

A vector processor or array processor is a CPU design that is able to run mathematical operations on multiple data elements simultaneously. A serial vector is a sequence of data held in registers that are processed by the same instruction. For example, a single instruction may cause four registers to be added to another four and the result written to a further four. A parallel vector holds several data items within the same register, each of which has the same instruction applied to it. Vector processing improves code density and allows optimizations that improve performance.

A common problem suffered by vector processors is the need to organize data within the register file such that the same instruction may be applied to a series of registers. Register files generally only allow simultaneous access to a set of values aligned along a particular direction, i.e., along a row of the vector. Accordingly, a single instruction can access multiple values for a horizontal operation, but vertical operation requires either transposing the array being operated or performing separate access operations for each value in a different row. It is common to spend several instructions re-arranging data to make it suitable for vector processing and this overhead may obviate the benefits of using a vector.

In view of these limitations, more efficient architectures and methods for performing transpose and other array manipulations are desired.

Yet another problem arises when a program instruction indirectly accesses a register. Microprocessors control programs' access to register files. Because of pipelining, some instructions must be stalled until the register from which they will read has been written to by another instruction. Scoreboarding stalls these instructions, so the program need not manage stalling. Stall condition is usually applied early in the execution pipeline. However, if a register is to be accessed indirectly by a program instruction, the register may not be known until it is too late—until after the stall condition would normally have already been applied. Without knowing the register at that earlier time, it is difficult to apply stall conditions for instructions that use indirect access.

The inventions disclosed in the present application provide mechanisms to handle indirect register access without additional scoreboarding hardware, and can be further used to build a flexible FIFO access mechanism.

Flexible Register File I/O Architecture

The present application discloses a register file input/output configuration in which a variety of data transpositions are available at minimum power. Power is conserved by avoiding register-to-register data transfers; instead, the sequencer provides executable microinstructions which imply a variety of apparent data formats (as seen by the data channel), without unnecessary physical transfers of data.

Various disclosed embodiments provide new ways for microprocessor register-files to be accessible, in multiple formats in order to reduce the number of program instructions required during byte, word and long word data reformatting. The disclosed innovations, in various embodiments, provide one or more of at least the following advantages:

Variety of data rearrangements;
Minimal power consumption;
Easy accommodation to special data reordering for digital signal processing operations;
Suitability to customized access to data with two-dimensional structure;
Suitability to customized access to data with multidimensional structure.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 1 shows how four consecutive registers are viewed with byte-transpose enabled. Each row in the diagram represents one register as viewed by a program. When Byte-Transpose is enabled, the register file is effectively rotated by 90°, so that Register 0 contains all the low-bytes of the four registers, register 1 contains all the second-bytes of the four registers, and so on.

FIG. 2 shows how two consecutive registers are viewed with word-transpose enabled. Each row in the diagram represents one register as viewed by a program. When Word-Transpose is enabled, the register file is effectively rotated by 90°, so that Register 0 contains all the low-words of the two registers, register 1 contains all the high-words of the two registers FIG. 3 shows the data in register 0 being byte swapped in two different ways. The first is a full (DCBA) byte-swap, in which the original data-bytes are swapped within the entire 32-bit word, and the second shows a BADC byte-swap taking place, which swaps the bytes within each word.

FIG. 4 shows an example of transposition consistent with an embodiment of the present innovations.

FIG. 5a shows a sample hardware register configuration, in which the register is separated into multiple multiport RAMs, each having multiplexers connected to each of its data lanes. FIGS. 5b-5g show different states of operation of this register: FIG. 5b shows the routing needed for a 32-bit word at address 0 without transpose; FIG. 5c shows routing for address 1 without transpose; FIG. 5d shows the routing needed for the first 32 bits of an eight bit transpose; FIG. 5e shows the routing for the second 32 bits of an eight bit transpose; FIG. 5f shows the routing for address 0 with a 16-bit transpose, in this sample implementation; and FIG. 5g shows routing for address 1 with a 16-bit transpose, in this sample implementation.

DETAILED DESCRIPTION OF PREFERRED EMBODIMENTS

Figure 5A:
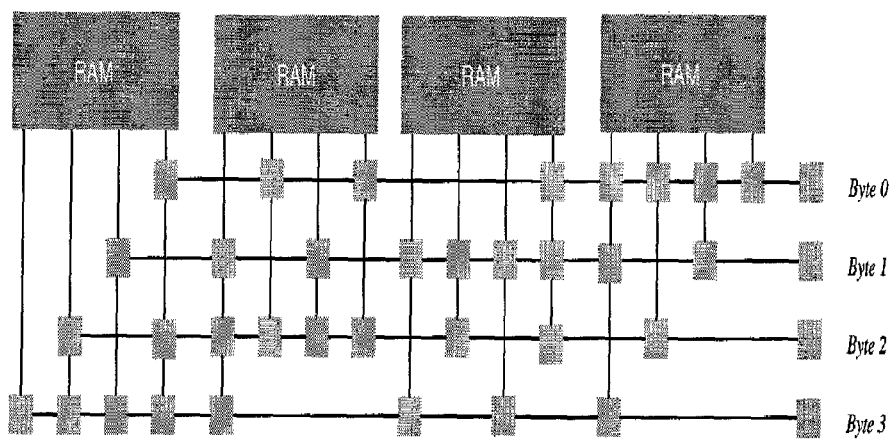
FIGS. 5a-5g are a set of related drawings.

The numerous innovative teachings of the present application will be described with particular reference to the presently preferred embodiment (by way of example, and not of limitation).

Transposable Register-File Operation

The transposable register-file is a novel microprocessor register-file data organization scheme which overcomes many of the disadvantages of traditional data organization in microprocessor register-file, and which has the benefits of allowing a microprocessor register-file to be viewed in multiple formats with a reduction of the number of program instructions required during byte, word and long word data reformatting. The preferred embodiment supports both byte-transpose and word-transpose.

Byte-Transpose Register File

FIG. 1 shows how four consecutive registers are viewed with byte-transpose enabled. With reference to FIG. 1, left hand side (110) illustrates those registers before transpose enabled and right hand side (120) illustrates the same registers after transpose enabled. Each row in FIG. 1 represents one register as viewed by a program. For instance, bottom row 211 shows Register 0 before transpose enabled. Each register in turn is composed of four bytes with the left most (for instance 0a) being the lowest byte and the right most (for instance 0d) being the highest byte. When byte-transpose is enabled, the register file is effectively rotated by 90°, so that Register 0 (121) contains all the low-bytes of the four registers, Register 1 (122) contains all the second-bytes of the four registers, and so on.

Word-Transpose Register File

Word-transpose is similar to byte-transpose, except that the register data is rotated on a per word basis instead of per byte basis. FIG. 2 shows how two consecutive registers are viewed with word-transpose enabled. With reference to FIG. 2, left hand side (210) illustrates those registers before transpose enabled and right hand side (220) illustrates the same registers after transpose enabled. Each row in FIG. 2 represents one register as viewed by a program. For instance, bottom row (111) shows Register 0 before transpose enabled. Each register in turn is composed of two words with the left most (for instance 0a) being the low word and the right most (for instance 0b) being the high word. When word-transpose is enabled, the register file is effectively rotated by 90°, so that Register 0 (221) contains all the low-words of the four registers, Register 1 (222) contains all the high-words of the two registers.

Register-File Byte-Mapping and Byte-Masking

The register-file byte-mapping and byte-masking functions add further flexibility to the novel microprocessor register-file data organization scheme. This feature of the disclosed inventions allows a program to arbitrarily reorganize the bytes within a register and has the benefits of further reduction of the number of program instructions required during byte, word and long word data reformatting.

Register-File Byte-Mapping

Byte-Mapping allows a program to arbitrarily reorganize the bytes within a register in order to isolate, or group, interesting sub-components when reading from, or writing to the register-file. FIG. 3 shows two examples of byte-mapping on a register. With reference to FIG. 3, left hand side (310) illustrates those registers before byte-mapping and right hand side (320) illustrates the same registers after byte-mapping. Each row in FIG. 3 represents one register as viewed by a program. For instance, bottom row (311) shows the Register before byte-mapping. Each register in turn is composed of four bytes with the left most (for instance 0a) being the lowest byte and the right most (for instance 0b) being the highest byte. When a byte-mapping of full (DCBA) byte swap is enabled, the original data-bytes are swapped within the entire 32-bit word, and the bytes in register (312) are reorganized as bytes in register (322). When a byte-mapping of (BADC) byte swap is enabled, the original data-bytes are swapped within each word, and the bytes in register (311) are reorganized as bytes in register (321).

Register-File Byte-Masking

The preferred embodiment supports both byte-mapping and byte-masking. Register-file byte masking is another novel microprocessor register-file data organization scheme that provides control over the bytes that are modified by an instruction in order to accelerate insertion of data into existing register. The program may specify a byte-mask both for source operands and destination operands. When byte-mask is specified for source operands, parts of a register may be forced to zero on input to an instruction. When byte mask is specified for destination operands, the result of an instruction can be written to parts of a destination register.

Indirect Register Access

The indirect register access has the benefits of providing indirect register access without additional scoreboarding hardware. It provides two types of instructions: one for moving data from one register to another register, and another for synchronization.

The instruction format for moving data specifies the following parameters: a register that holds the source data, a register that holds either the destination register or the index of the destination register, and optionally a count of the number of registers to transfer. If the destination register is directly referenced in the instruction, those registers directly referenced in the instruction are scoreboarded when the instruction is executed. However, if the destination register is not directly referenced in the instruction, those registers indirectly referenced in the instruction are not scoreboarded when the instruction is executed and synchronization instruction will be used to ensure that the data in the register indirectly accessed is correct.

In a typical use of this invention, a programmer uses a number of registers as scratchpad memory. Data is loaded into the scratchpad. If there is a switch from a direct to indirect access of register or vice versa, a synchronization instruction is issued to calculate an index into the scratchpad and the contents of the register at that index are copied into a known register. At this point all processing elements may use the same instruction to process data at the same register index. When the calculation is complete, the result may be copied back to the scratchpad and another synchronization instruction is issued to calculate the index.

Implementation of Hardware Data FIFO in Register-File

The provision of hardware data FIFO in microprocessor register-file uses similar ideas of indirect register access. This innovative feature, in the preferred embodiment, sets aside a number of registers from the microprocessor register-file for the FIFO storage, and provides a mechanism for moving data into the FIFO, from another source, and for moving data serially out of the FIFO into other registers within the microprocessor. It has the benefits of:

Building the FIFO in the processor register file allows those registers to be re-used as normal registers when the FIFO is not needed.

The invention allows the size of the FIFO (and thereby the number of reserved registers) to be changed under program control.

It solved the indirect access problem in a hardware register FIFO implementation.

Example of Use of Transpose and Byte-Mapping

Pixel data is often stored in what is called the RGBA8888 format, in which each pixel is made up of red, green, blue, and alpha components, each of 8 bits. All four components are packed into one 32-bit word for convenience of display.

In common algorithms such as blending the alpha component is used to modify the color components as follows:

```
dstR = (srcR * srcA) + dstR
dstG = (srcG * srcA) + dstG
dstB = (srcB * srcA) + dstB
```

Sample assembler code for this algorithm is:

```
mul tmp[0], src[0], src[3]
mul tmp[1], src[1], src[3]
mul tmp[2], src[2], src[3]
add dst[0], tmp[0], dst[0]
add dst[1], tmp[1], dst[1]
add dst[2], tmp[2], dst[2]
```

Where the syntax is instruction, destination, source A, source B. The array indices refer to the byte position in the pixel.

The code may be reduced if a parallel vector is used, but the alpha component must be repeated in each byte of a 32-bit register. This can be done using a byte swap mode:

```
set byte swap mode for srcB to DDDD
mul tmp, src, src
reset byte swap mode for srcB to ABCD
add dst, dst, tmp
```

Note that this code only produces 3 bytes of results even though the registers hold 4 bytes. If 4 pixels are processed as a serial vector this inefficiency can be removed:

```
transpose srcA
transpose srcB
vector_3_mul tmp, src, src
transpose dst
vector_3_add dst, dst, tmp
```

Transposing srcA causes all the red components to be in one register, all the green in another, and all the blue in a third. Transposing srcB causes all the alpha components to be in one register. Vector instruction of length three cause four pixels to be processed in 3 instructions (the stride of the srcB vector must be zero to use the same alpha value for each component).

Register File Implementation

Details of a sample implementation will now be described. In this implementation, the register file is used for all storage within the processing element and holds a generous 256 registers, each 32-bits wide. The registers are perhaps more important to overall system performance than the ALU because they control the movement of data, and a SIMD array typically has high compute performance relative to data bandwidth. The register file can be large because it absorbs a number of FIFOs that would normally be needed to feed the ALU. All registers are preferably scoreboarded, so any instruction that attempts to read a register that has a write scheduled for it will stall until the write completes.

Parallel Vectors

To make good use of the ALU, several data items may be packed into one register. The ALU may work on four 8-bit items at a time, or two 16-bit items, but the operation is always the same. This is similar to vector calculations, and when more than one item of data is held in a register it is referred to as a parallel vector (pvec as opposed to svec for vectors executed sequentially). Pvecs can boost performance if it is not too expensive to get data into an appropriate format.

An example of using pvecs is to take four pixels of red, green, blue, and alpha, and re-group them such that common components are in the same register (so grouped as RRRR, GGGG, BBBB, AAAA). Then different operations can be applied to each component at full speed (it is common for alpha to be processed differently than RGB). If you imagine the four pixels as a four by four array of bytes, the source format has RGBA in rows and the processing needs them in columns and to get into this format requires transposing the pvecs. After processing is complete the transpose needs to be reversed.

The register file supports zero-cost transposing for 8 or 16 bit pvecs. If the data type is 16 bits the register set is treated as being in pairs and the transposition takes place assuming two registers hold a 2×2 array of data. If the data type is 8 bits then four registers are assumed to hold a 4×4 array of data. Transposition is free because the register file is made up of four separate RAMs, which gives access to four different registers at the same time. The lower bits of the register address select the bytes to use, so registers to be transposed must be in sequential registers and must be aligned to the number of registers that will be transposed.

Transposition also allows efficient memory access for 24 bit components. If data is stored byte-planar with four bytes of each component stored in the same 32 bit word the layout would be as shown in FIG. 4. This is a useful way to store 24 bit data because there is no wastage but neither is there a difficult address calculation or nasty data shifting. In some algorithms it is convenient to process the components individually, but in others the whole pixel may be needed. Transposition allows this byte planar format to be converted into 32 bit pixels.

The register file has, in principle, three read ports and two write ports. Two of the read ports are used by the ALU, as is one of the write ports. The remaining read and write ports are used to get memory data in and out of the registers. For best performance the RAM used to build the register file should have all five ports, but that will make it large. A compromise is possible in which one read and one write port are removed.

Because the register file is made up of four separate RAMs for transposition, it is possible to arrange accesses to them so that while the ALU accesses one RAM another can be used for memory data. The vector operations result in the registers being accessed in a predictable pattern. The trick is to arrange the addressing so that memory accesses follow the same pattern as vector operations, but staggered so that they don't use the same RAM at the same time. This is not always possible when transposing because the ALU may need access to all four RAMs. When there is contention for the register file the memory wins and the ALU stalls (this is the cost of not having all 5 ports).

Indirect Accesses

Indirect register access allows the contents of one register to form the index to another. It is obviously useful for histograms, but also for FFT data shuffling and median filtering. It is difficult to implement because all PEs may access different registers, which breaks the SIMD model and requires additional scoreboarding hardware.

The media processor imposes a slight restriction that avoids the hardware cost. Special instructions are used to copy data from one register to another; the register to copy from (or to) is specified in another register. The restriction is that while indirection is in use any register that may be indirectly accessed must not be used directly. This removes the need to scoreboard the indirectly accessed register, while the directly accessed register is scoreboarded to ensure correct operation. The cost is an extra instruction per indirection.

Details of Sample Hardware Implementation

FIGS. 5a-5g are a set of related drawings, which collectively show a sample hardware implementation and its various operational modes.

FIG. 5a shows a sample hardware register configuration, in which the register is separated into multiple multiport RAMs 510, each having multiplexers 520 connected to each of its data lanes. Four RAMs may be connected to support transposing. Each RAM is 32 bits wide and shows four bytewide lanes. Each RAM holds every fourth entry in the register file. The dotted boxes are multiplexers that switch between the two inputs. This hardware implementation permits all of the above functional relationships to be realized.

The multiplexers can be, for example, simple by-8 circuits having two states, selected by a single control bit (per multiplexer). These control bits can be set, for example, by appropriate configuration instructions.

FIGS. 5b-5g show different states of operation of this register. In these diagrams, only the active inputs to active multiplexers 520 are shown.

Figure 5B:
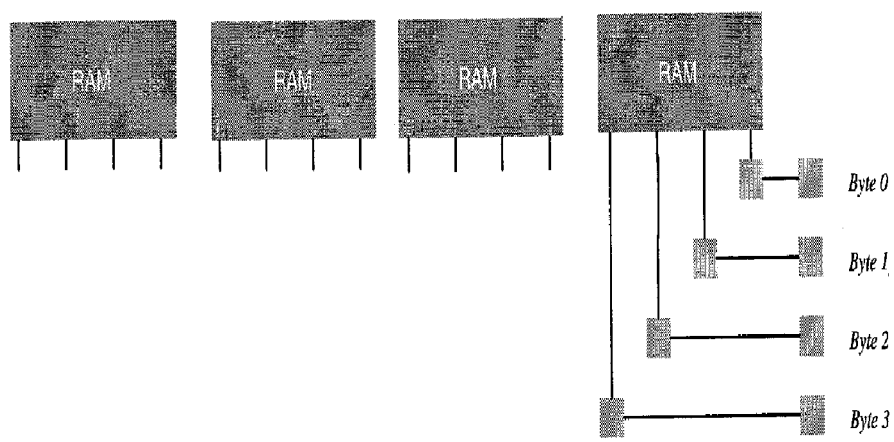

FIG. 5b shows the routing needed for a 32-bit word at address 0 without transpose, in this sample implementation.

Figure 5C:
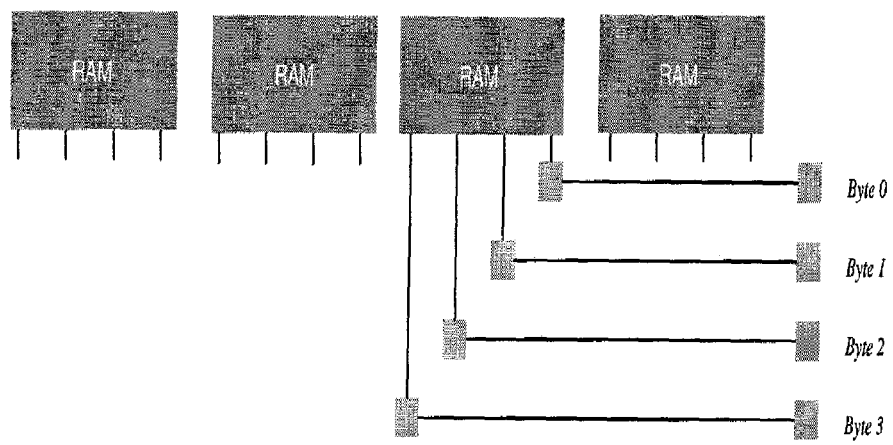

FIG. 5c shows routing for address 1 without transpose, in this sample implementation.

Figure 5D:
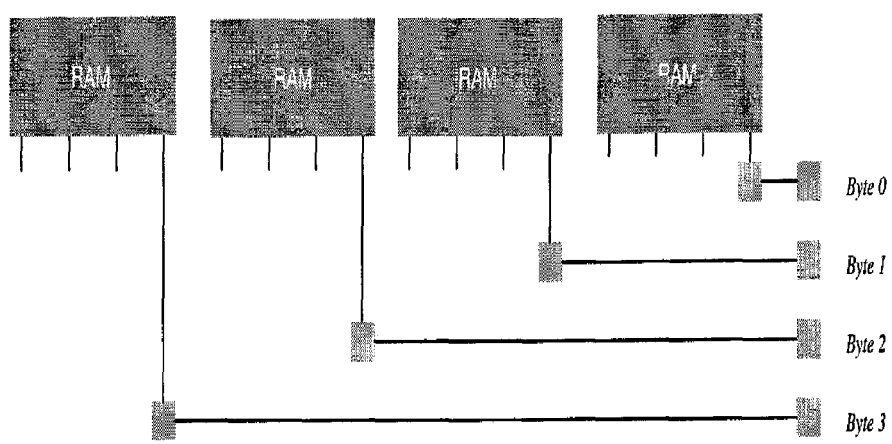

FIG. 5d shows the routing needed for the first 32 bits of an eight bit transpose; the lower byte of each RAM is connected to a different byte lane, in this sample implementation.

Figure 5E:
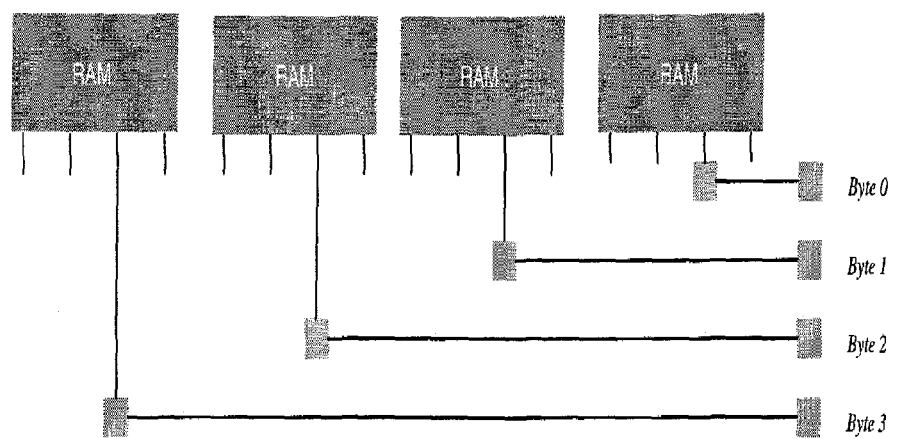

FIG. 5e shows the routing for the second 32 bits of an eight bit transpose, in this sample implementation.

Figure 5F:
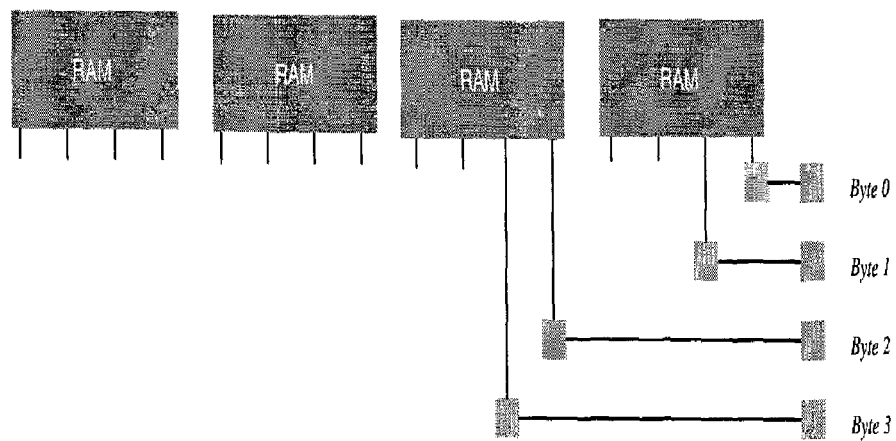

FIG. 5f shows the routing for address 0 with a 16-bit transpose, in this sample implementation.

Figure 5G:
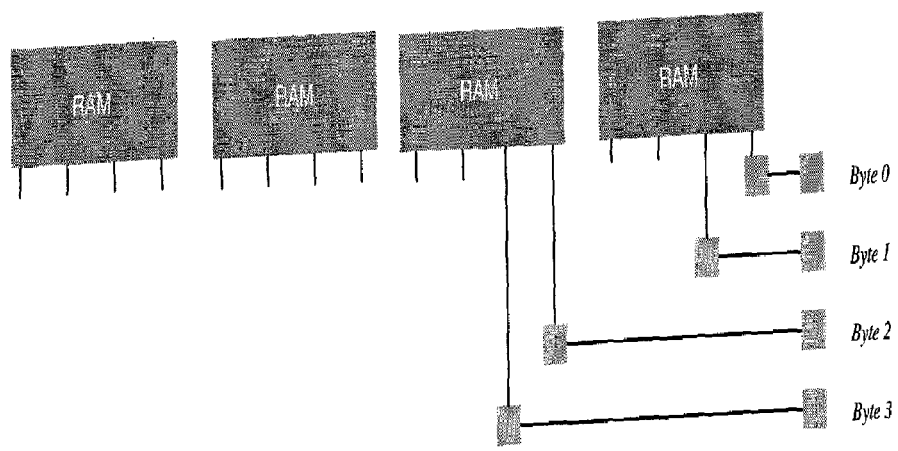

FIG. 5g shows routing for address 1 with a 16-bit transpose, in this sample implementation.

This hardware implementation can of course be varied, but this shows how an extremely versatile set of output reordering options can be achieved by multiplexing, WITHOUT unnecessary register-to-register transfers (which consume power).

Additional detail of the preferred implementation is shown in U.S. application Ser. No. 11/536,483, which is hereby incorporated by reference in its entirety. This implementation is an advantageous context for the disclosed inventions, but it should be emphasized that the I/O architecture described in the present application can also be used in many other contexts.

According to a disclosed class of innovative embodiments, there is provided: A method of selectably transposing data accessed in a register, comprising the actions of: storing data in n memory segments, each having n data lanes at the output thereof; and selectably connecting each of n data bus segments to a respective one of said $n^2$ data lanes; whereby a desired data transposition is provided at the time of register access without register-to-register transfers.

According to a disclosed class of innovative embodiments, there is provided: An electronic system, comprising: a logic unit; and at least one I/O register, comprising multiple memory segments each holding a respective fraction of a data set, said data set being distributed across said segments in a consistent pattern, and each said memory segment providing multiple lanes of data path; and multiple multiplexers, each connected to connect a respective output bus segment to a respective data path of a respective one of said memory segments.

Indirect Register Write

Figure 6:
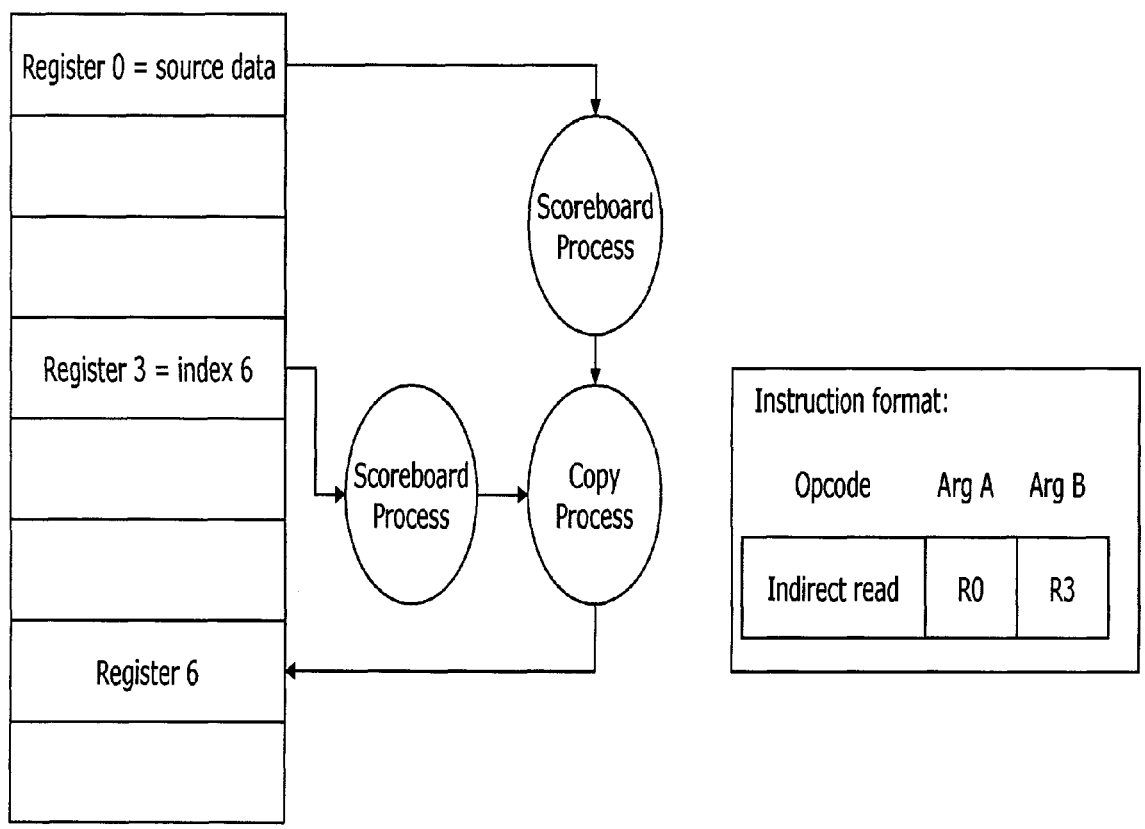
FIG. 6 shows an example of indirect register write consistent with an embodiment of the present innovations.

FIG. 6 shows an example of indirect register write consistent with an embodiment of the present innovations.

The source data is in register 0, the index of the destination register is in register 3, the destination register is index 6.

The reads from registers 0 and 3 are checked against the scoreboard and will stall if a write already in flight will modify them. The write to register 6 is not scoreboarded and is unconditionally executed.

Indirect Register Read

Figure 7:
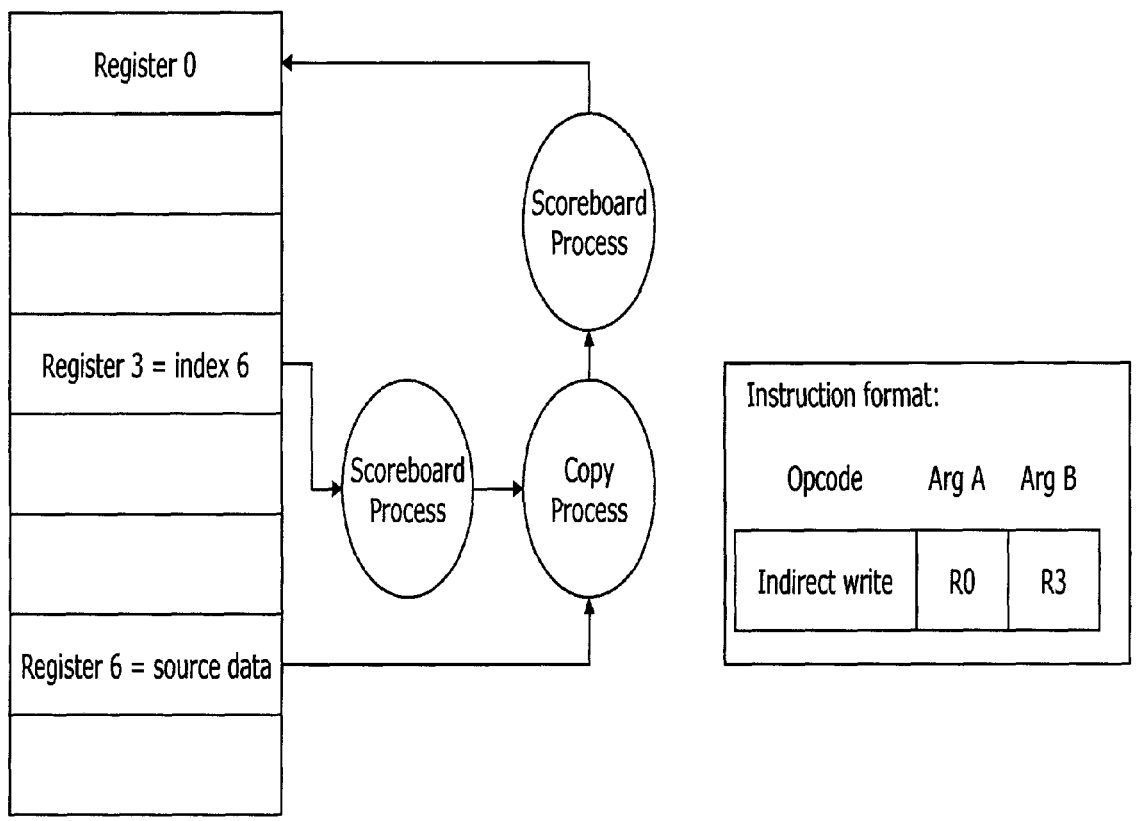
FIG. 7 shows an example of indirect register read consistent with an embodiment of the present innovations.

FIG. 7 shows an example of indirect register read consistent with an embodiment of the present innovations.

The source data is in register 6, the index of the source register is in register 3, the destination register is index 0.

The read from register 3 is checked against the scoreboard and will stall if a write already in flight will modify it. The read from register 6 is not scoreboarded and is unconditionally executed. The write to register 0 is scoreboarded.

Register FIFO Read

Figure 8:
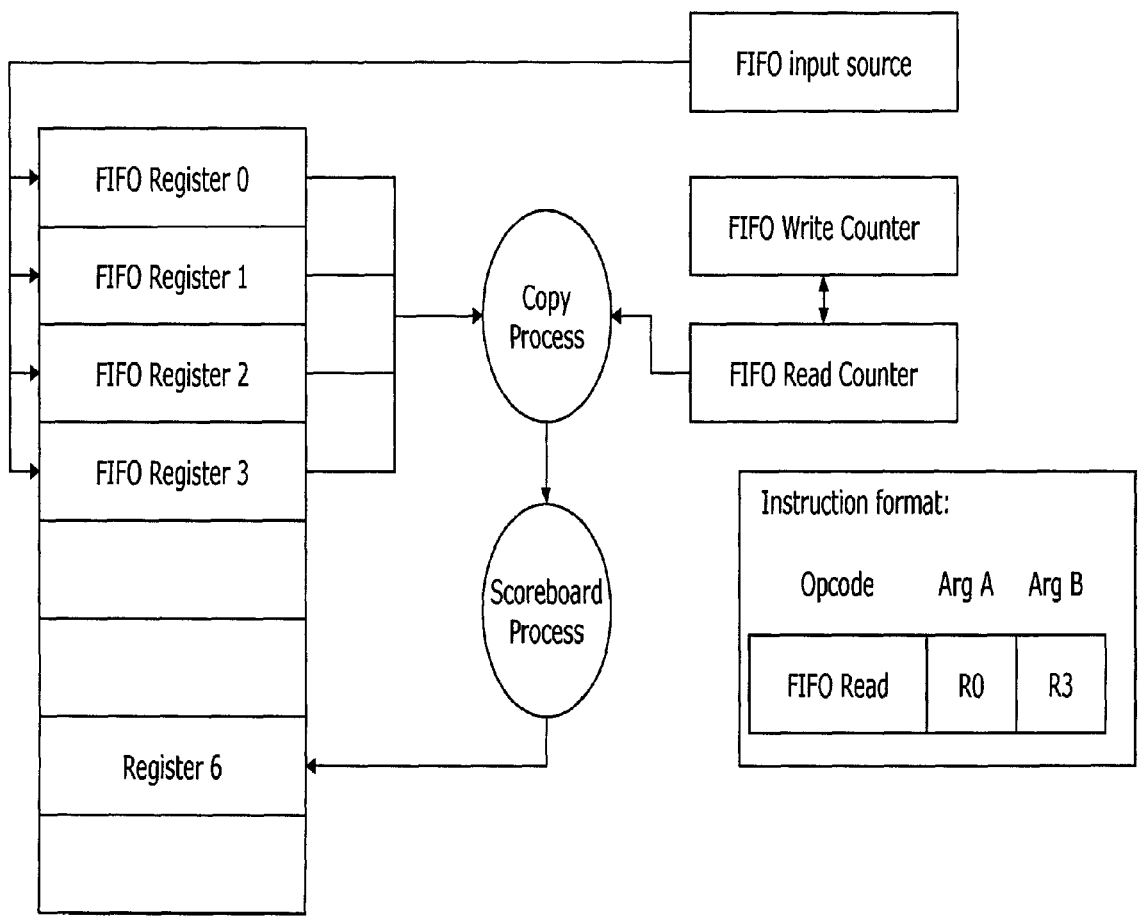
FIG. 8 shows an example of register FIFO read consistent with an embodiment of the present innovations.

FIG. 8 shows an example of register FIFO read consistent with an embodiment of the present innovations.

Data is written into the FIFO from the FIFO input source. The FIFO write counter and FIFO read counter are compared to implement standard FIFO protocols.

Registers 0 to 3 are allocated to the FIFO. The FIFO counter indexes the FIFO entry to read. Register 6 is specified as the register to receive the FIFO data.

The read from the FIFO register is not scoreboarded, the write to the destination register is scoreboarded.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

For example, the multiple access modes provided by the disclosed embodiments are particularly useful for graphics and image processing, they can also be especially useful for data which has internal 3-D or 4-D structure (e.g. a time series of voxel images). In such cases the capability for customized data transpositions can help with filtering and transformations.

For another example, a flexible register can optionally implement some but not all of the transpositions described above, and/or can implement additional transpositions besides those listed.

For another example, the disclosed hardware implementation uses byte-wide "lanes", but alternatively and less preferably a different fineness can be used. If fast nibble transpositions are desired, 8 RAMs could be used instead of four, with 8 lanes instead of four on each RAM, and 8 output busses instead of four. Note, however, that the number of multiplexers would quadruple if this were done.

For another alternative and less preferable example, more logic can be added into the multiplexers if desired. For instance, the multiplexers can be given additional states wherein the 8-bit output is not only connected to a selected input (or none), but wherein the bits of the input can be permuted, pairwise exchanged, complemented, ANDed, etc. Additional control bits would preferably be routed to the multiplexers in such cases.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method of accessing data within a register file, comprising the steps of:
   identifying a first register by means of a first field in a first instruction;
   identifying a second register by means of a second field in a second instruction;
   copying data from the first register to a third register, the index of the third register being held in the second register, wherein the third register is not directly referenced in the first instruction or the second instruction and is not checked for scoreboard conflicts while being indirectly used;
   using synchronization instructions to ensure that data in the third register is correct; and
   using a plurality of registers as scratchpad memory, including loading data into at least one of the plurality of registers, issuing a synchronization instruction to calculate an index into one of the plurality of registers, and copying the contents of the register at the calculated index into a known register;
   wherein access to the first and second registers is checked for scoreboard conflicts; and
   wherein while indirection is in use, the third register must not be used directly.

2. The method of claim 1, further comprising:
   enabling a transpose function with respect to a selected register; and
   modifying a view of the selected register, as seen by an external access, such that data in the selected register is replaced with data from a plurality of consecutive registers.

3. The method of claim 2, wherein modifying a view of the selected register effectively rotates the apparent orientation of data in said selected register.

4. The method of claim 2, wherein modifying a view of the selected register effectively applies bytewise transposition to said view.

5. The method of claim 2, wherein modifying a view of the selected register effectively applies wordwise transposition to said view.

6. The method of claim 1, further comprising:
   storing data in n memory segments, each having n data lanes at the output thereof; and
   selectably connecting each of n data bus segments to a respective one of said n2 data lanes;
   wherein a desired data transposition is provided at the time of register access without register-to-register transfers.

7. The method of claim 6, wherein each said data lane carries 8 bits of data.

8. The method of claim 6, wherein said selectably connecting step is performed by activating only n of a total of n2 multiplexers.

9. The method of claim 6, wherein n=4.

10. The method of claim 1, further comprising identifying a count of a number of registers to be transferred.

11. A system for accessing data within a register file, the system comprising a processor and memory, the processor being configured to:
    identify a first register by means of a first field in a first instruction;
    identify a second register by means of a second field in a second instruction;
    copy data from the first register to a third register, the index of the third register being held in the second register, wherein the third register is not directly referenced in the first instruction or the second instruction and is not checked for scoreboard conflicts while being indirectly used;
    use synchronization instructions to ensure that data in the third register is correct; and
    use a plurality of registers as scratchpad memory, including loading data into at least one of the plurality of registers, issuing a synchronization instruction to calculate an index into one of the plurality of registers, and copying the contents of the register at the calculated index into a known register;
    wherein access to the first and second registers is checked for scoreboard conflicts; and
    wherein while indirection is in use, the third register must not be used directly.

12. The system of claim 11, wherein the processor is further configured to:
    enable a transpose function with respect to a selected register; and
    modify a view of the selected register, as seen by an external access, such that data in the selected register is replaced with data from a plurality of consecutive registers.

13. The system of claim 12, wherein modifying a view of the selected register effectively rotates the apparent orientation of data in said selected register.

14. The system of claim 12, wherein modifying a view of the selected register effectively applies bytewise transposition to said view.

15. The system of claim 12, wherein modifying a view of the selected register effectively applies wordwise transposition to said view.

16. The system of claim 11, wherein the processor is further configured to:
    store data in n memory segments, each having n data lanes at the output thereof; and
    selectably connect each of n data bus segments to a respective one of said n2 data lanes;
    wherein a desired data transposition is provided at the time of register access without register-to-register transfers.

17. The system of claim 16, wherein each said data lane carries 8 bits of data.

18. The system of claim 16, wherein the processor is further configured to selectably connect each of n data bus segments to a respective one of said n2 data lanes by activating only n of a total of n2 multiplexers.

19. The system of claim 16, wherein n=4.

20. The system of claim 11, wherein the processor is further configured to identify a count of a number of registers to be transferred.

\* \* \* \* \*